United States Patent [19]

Cosselmon, Jr.

[11] Patent Number: 4,733,686

[45] Date of Patent: Mar. 29, 1988

[54] APPARATUS FOR REMOVING WATER VAPOR FROM COMPRESSED AIR

[76] Inventor: William E. Cosselmon, Jr., 2826 Downs Rd., P.O. Box 207, Weedsport, N.Y. 13166

[21] Appl. No.: 10,627

[22] Filed: Feb. 4, 1987

[51] Int. Cl.⁴ .............................................. F16T 1/34
[52] U.S. Cl. ...................................... 137/203; 55/269
[58] Field of Search ....................... 137/203, 204, 340; 55/269, 267

[56] References Cited

U.S. PATENT DOCUMENTS

| | | | |
|---|---|---|---|
| 2,125,248 | 7/1938 | Taylor | 137/340 X |
| 3,402,529 | 9/1968 | Frantz | 137/204 X |
| 4,018,579 | 4/1977 | Hofmann | 137/203 X |

Primary Examiner—Alan Cohan
Attorney, Agent, or Firm—Charles S. McGuire

[57] ABSTRACT

The disclosed apparatus comprises means for effectively removing excess moisture from compressed air such as employed, for example, in spray painting applications. The outlet line from an air compressor is connected to the inlet of hollow coil of metal with good heat conductivity, such as copper or aluminum, having an outlet connected to an air manifold. The coil and manifold are both immersed in chilled water, whereby the temperature of the air and its capacity to hold water vapor are significantly lowered to cause the water to be condensed in liquid form and collect at the bottom of the manifold.

7 Claims, 4 Drawing Figures

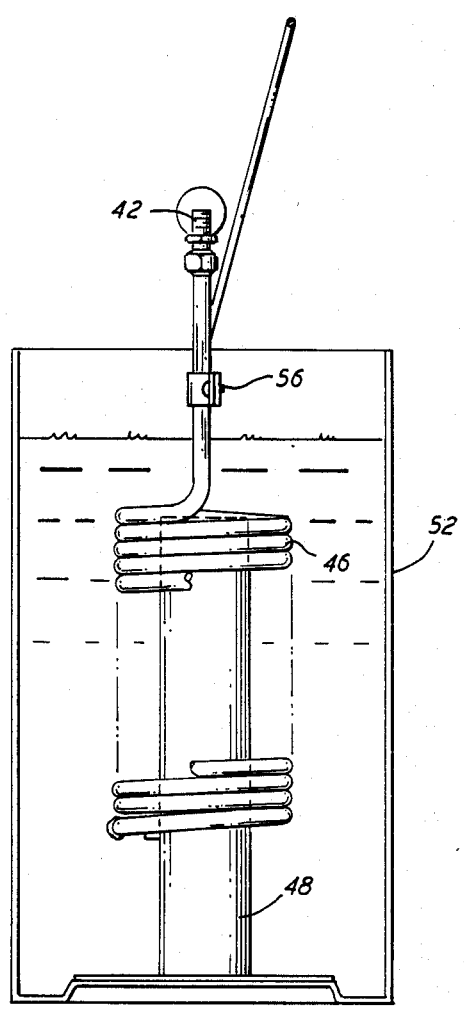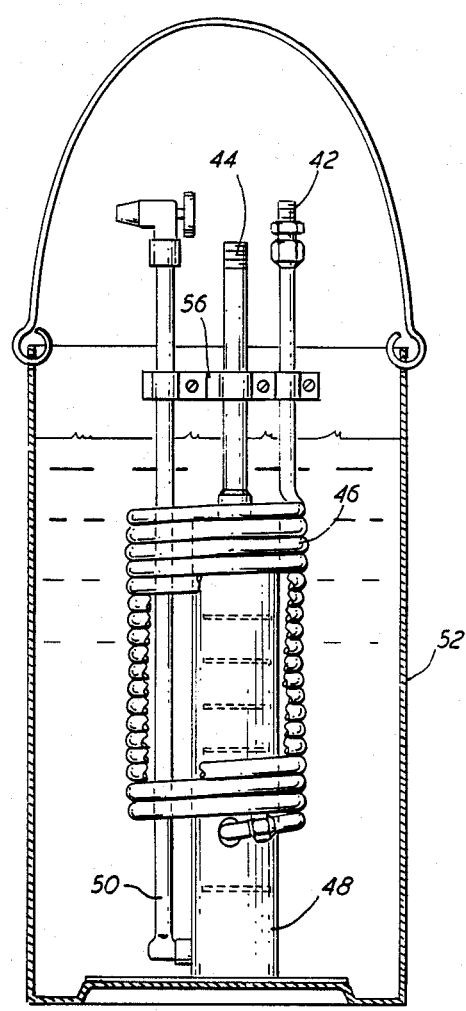

APPARATUS FOR REMOVING WATER VAPOR FROM COMPRESSED AIR

BACKGROUND OF THE INVENTION

The present invention relates to means for removing water vapor from compressed air, and more specifically to apparatus for cooling a supply of compressed air to condense and remove therefrom water initially present in the air supply prior to controlled release and use of the air.

Compressed air from relatively small scale compressors is used in a number of applications, e.g., the operation of spray painting equipment. As the air is compressed and heated its capacity to hold water vapor increases, and the condensation of water as the air is expanded and cooled upon release is very objectionable in such cases since it becomes mixed with the paint and deposited upon the surface being painted. Thus, it is desireable to dry the air, i.e., to remove at least a substantial portion of the water vapor while it is in the compressed state.

It is a principal object of the present invention to provide relatively simple and inexpensive, portable apparatus for use with convention compressors to remove water vapor from compressed air.

A further object is to provide apparatus for attachment to a relatively small scale air compressor to lower the temperature of the compressed air, thereby condensing water vapor contained thereby.

Still another object is to provide compact and lightweight apparatus for immersion in a separate container of chilled water for the purpose of removing water vapor from compressed air.

Other objects will in part be obvious and will in part appear hereinafter.

SUMMARY OF THE INVENTION

In accordance with the foregoing objects, the invention contemplates an arrangement of components including a coil of metal tubing having an upper end connected to the outlet line of an air compressor and lower end connected to an air manifold. Both the coil, preferably having a length of at least about 25 feet, and the manifold are immersed in chilled water, either in a container forming part of the apparatus or in a separate container. The drop in temperature lowers the capacity of the air to hold water vapor, which is thereby condensed to liquid form and collected at the bottom of the manifold.

A water removal line is connected at its lower end to the manifold adjacent the lower end thereof and below the point of connection of the coil to the manifold. By opening a manually operable valve at the upper end of the water removal line, water collected in the manifold is blown out by the compressed air through the valve. The dry compressed air is supplied to a paint sprayer or other pneumatically operated device through a line connected to the upper end of the manifold.

BRIEF DESCRIPTION OF THE DRAWING

FIG. 3 is a front elevational view, partly in section, with portions broken away, of a second embodiment of the invention; and FIG. 4 is a side elevational view of the embodiment of FIG. 3.

DETAILED DESCRIPTION

Figure 1:
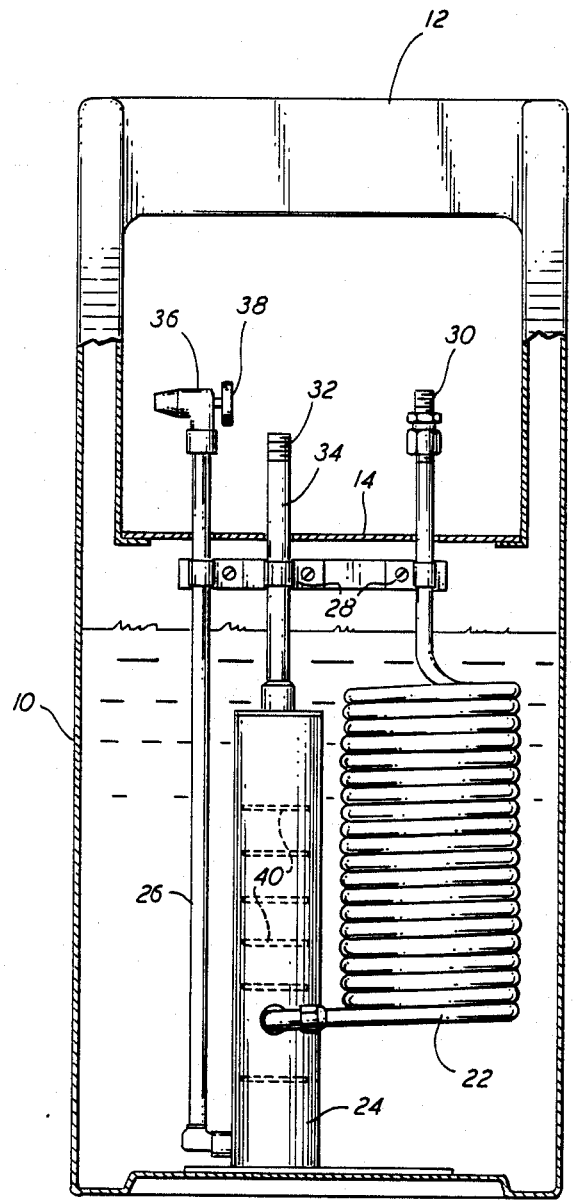
FIG. 1 is a front elevational view of the apparatus of the invention in a first embodiment including a closed container which is shown in section.
Figure 2:
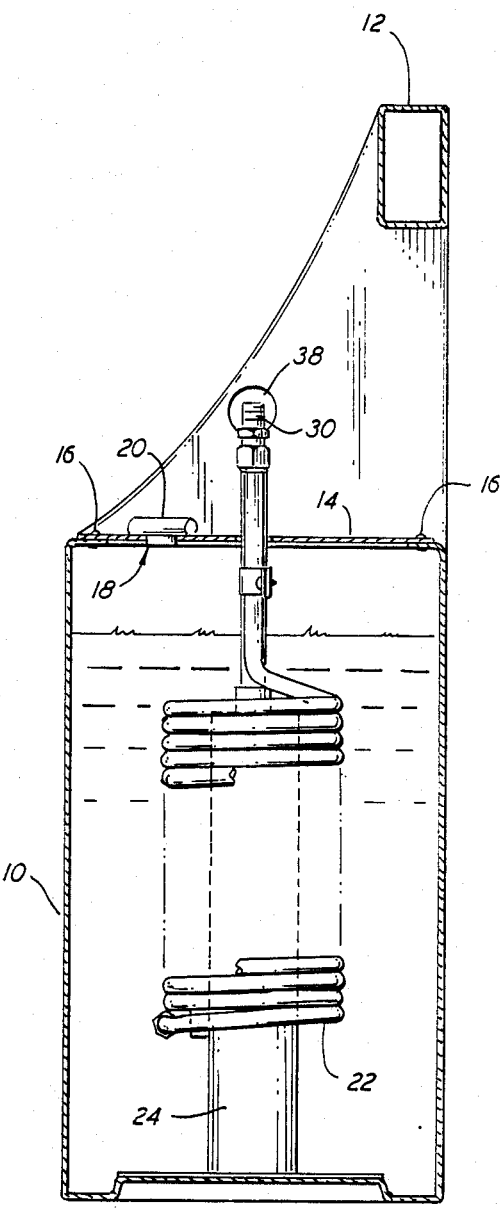
FIG. 2 is a side elevational view of the apparatus of FIG. 1, also with the container in section.

Referring now to the drawings, in FIGS. 1 and 2 is shown an embodiment of the invention which includes tank 10 having integral handle means 12 and cover 14, held in place by screws 16. The tank, handle and cover may, of course, be provided in any suitable configuration and material, the illustrated design being especially adapted for vacuum molded plastic construction. Opening 18, having removable cap 20, is provided in cover 14 for filling tank 10 with cold water, for purposes described later.

Positioned within tank 10 are coil 22, condenser body or manifold 24, and water purge pipe 26, each having upper portions connected by pipe clamps 28 within tank 10 and extending through openings of appropriate size and position in cover 14. Fitting 30 at the upper end of the tube extending upwardly from coil 22 is adapted to have connected thereto the outgoing air line from a conventional air compressor (not shown). Upper end 32 of pipe 34, extending upwardly from manifold 24 through cover 14, is adapted for connection to a pneumatically operated device, such as a paint spray gun (not shown). The upper end of pipe 26 is provided with valve 36, which may be selectively opened and closed by manually operable control knob 38.

Thus, is may be seen that, between the compressor and the pneumatically operated tool, the air passes through coil 22 and manifold 24 which may be provided with internal plates or baffles 40 for contact by the air as it flows through the manifold. Tank 10 is filled with cold water, preferably near its freezing point, to a level at which coil 22 and manifold 24 are completely immersed. Other liquids or water solutions having a freezing point below 32° F. may be used, if desired. Coil 22 preferably has a length of at least 25 feet of ⅜" OD copper or aluminum tubing when used with typical air compressors with the capacity of 0 to 150 psi.

As the compressed air passes through coil 22 and manifold 24, its temperature and capacity to hold water vapor are significantly reduced. Therefore, a major portion of the water vapor will condense within coil 22 and/or manifold 24, and will collect in the lower part of manifold 24. The lower end of water purge tube 26 is connected to manifold 24 near the bottom thereof, whereby the condensate may be removed by opening valve 36 and allowing the force of the compressed air to blow the water out through tube 26.

Turning now to FIGS. 3 and 4, the apparatus is shown in a second embodiment. Operation is basically the same as in the first embodiment, with fitting 42 being connected to the incoming air line from the compressor, and fitting 44 to the air line leading to the paint spray or other tool. In the present embodiment, however, coil 46 surrounds manifold 48 and purge tube 50, providing a more compact form of the apparatus. Also, the present embodiment is less costly, since it does not include a tank. Instead, the interconnected coil, manifold and purge tube are placed in a separate container, such as bucket 52, of cold water. Stability is provided by mutual connection of upper portions of tube 50, coil 46, and tube 54, extending upwardly from manifold 48 to fitting 44, by meas of clamps 56, as well as the connections of coil 46 and tube 50 to manifold 48 near the lower end thereof. If desired, the apparatus, i.e., coil 46, manifold 48 and tube 50, may be enclosed within a closely fitting, protective jacket, having a plurality of perforations 62 to allow the cold liquid in the container in which the apparatus is placed to fill the jacket and immerse coil 46 and manifold 48.

What is claimed is:

1. A manually transportable device for selective connection in a line between an air compressor and a pneumatically operated tool for rapid condensation and removal of water vapor from the compressed air by transfer of heat from the compressed air to a chilled liquid, said device comprising, in combination:
    (a) a continuous length of hollow tubing extending from an upper, inlet end, adapted for connection to an air compressor, downwardly through a helically coiled section, to a lower, outlet end;
    (b) a manifold section having a lower portion directly communicating with said outlet end of said hollow tubing;
    (c) an outlet tube extending upwardly from and communicating directly with an upper portion of said manifold to an upper end adapted for connection to a pneumatically operated tool;
    (d) manually transportable container means adapted to hold a quantity of chilled liquid in which said hollow tubing and manifold are immersed at a level below said inlet and outlet ends;
    (e) a water purge tube having a first end connected to and communicating directly with said lower portion of said manifold at a position below said outlet end of said hollow tubing within said liquid, and extending to a second end outside said liquid; and
    (f) valve means at said second end of said purge tube selectively movable to an open position to remove water condensed from the water vapor in the compressed air from the bottom of said manifold.

2. The invention according to claim 1 wherein said tubing is coiled about a vertical axis and including a vertically extending portion adjacent said inlet end.

3. The invention according to claim 2 wherein said purge tube extends vertically upwardly between said first and second ends thereof.

4. The invention according to claim 3 wherein said vertically extending portion of said tubing, said upper end of said outlet tube and said second end of said purge tube are essentially parallel and laterally adjacent to one another.

5. The invention according to claim 4 and further including clamp means mutually connecting said vertically extending portion of said tubing, said outlet tube and said purge tube.

6. The invention according to claim 1 and further including handle means connected with said container means for manual transport thereof.

7. The invention according to claim 6 wherein said handle means is integrally formed with said container means.

* * * * *